United States Patent [19]

Rudnev et al.

[11] Patent Number: 4,760,762
[45] Date of Patent: Aug. 2, 1988

[54] METHOD OF MAKING DIE SET LINE

[75] Inventors: Ivan E. Rudnev; Viktor V. Kulikov, both of Tolyatti, U.S.S.R.

[73] Assignee: Volzhskoe Obiedinenie Po Proizvodstvu Legkovykh Avtomobilei, Tolyatti, U.S.S.R.

[21] Appl. No.: 903,576
[22] PCT Filed: Mar. 27, 1985
[86] PCT No.: PCT/SU85/00025
    § 371 Date: Aug. 1, 1986
    § 102(e) Date: Aug. 1, 1986
[87] PCT Pub. No.: WO86/05731
    PCT Pub. Date: Oct. 9, 1986
[51] Int. Cl.⁴ .............................................. B23H 9/12
[52] U.S. Cl. .................................................. 76/107 R
[58] Field of Search .......................... 76/107 R, 101 R

[56] References Cited
FOREIGN PATENT DOCUMENTS 1483734  8/1977  United Kingdom ............. 76/107 R
 774891 10/1980  U.S.S.R. .
 872161 10/1981  U.S.S.R. .
1060383 12/1983  U.S.S.R. .

OTHER PUBLICATIONS

N. K. Foteev, "Electromachining Processes", Mashinostroenie Publishers, 1980, Moscow, pp. 142–143.
V. M. Vladimirov, "Manufacture of Die Sets, Press Moulds, and Fixtures", Vysshaya Shkola Publishers, Moscow, 1981, pp. 226–230.

Primary Examiner—Roscoe V. Parker
Attorney, Agent, or Firm—Fleit, Jacobson, Cohn & Price

[57] ABSTRACT

The method of making a die set line involves correction of the first blanking die set in the line, in accordance with the results of stamping the blank produced using the other die sets. The blank is made with a wire tool electrode by virtue of electrical discharge machining. The electrical discharge machining program is adjusted in accordance with the results of stamping the blank using the other die sets in the line. Thereafter, once the corrected blank is produced, it is used for making tool electrodes for electrical discharge machining of the working parts of the first blanking die set in the line.

1 Claim, 1 Drawing Sheet

METHOD OF MAKING DIE SET LINE

BACKGROUND OF THE INVENTION

The present invention relates to the field of engineering, and more particularly to a method of making a line of die sets.

In making die sets, provisions have been made for reducing labor consumption and the amount of hand fitting.

There is known a method of making a die set line (cf. Textbook "Manufacture of Die Sets, Press Moulds, and Fixtures", by V. M. Vladimirov, Moscow, Vysshaya Shkola Publishers, 1981, pp. 226–230), including blanking, drawing, trimming, piercing, and outward flanging die sets, wherein a line of die sets is made according to the theoretical contour of a blank. The blanking die set is used for blanking operation and the forming die sets, including sets for drawing, trimming, piercing, outward flanging, are used for stamping operations. Compliance with a reference drawing is checked. Should it be impossible to produce an adequate part from the cut-out blank, the working parts of the blanking die set, which include male and female dies, a stripper, and a knock-out, are final finished along their contours. Thereafter, a new blank is cut and a new part is stamped in forming die sets, whereupon said part is checked for compliance with dimensions specified in the drawings involved. The above operations must be repeated until an adequate part is produced. Should it be impossible to final finish the working parts of the blanking die set, new working parts must be made.

Final finishing of the working parts of the blanking die set made according to the theoretical contour of the blank is necessitated by the fact that metal ductility, anisotropy of its properties, and ironing in the process of stamping at each of the bend points are not allowed for in the theoretical calculations of the blank contour.

The aforesaid method features a long manufacturing cycle, considerable labor consumption, and a great amount of hand fitting.

SUMMARY OF THE INVENTION

It is an object of the present invention to provide such a method which makes it possible to reduce labor consumption in making a blanking die set due to a number of technological improvements introduced in the manufacture of its working parts.

The object is attained by a method of making a die set line, according to which the first blanking die set in the line is corrected in compliance with results of stamping the blank produced using the other die sets. A blank is made by electrical discharge machining with the aid of a wire tool electrode, the electrical discharge machining program being connected in accordance with results of stamping the blank using the other die sets. Once the correct blank is produced, tool electrodes are made for electrical discharge machining of the working parts of the first blanking die set, in the line.

The herein-disclosed method of making a line of die sets provides for:
 reduced labor consumption;
 smaller amount of hand fitting; and
 shorter manufacturing cycle.

BRIEF DESCRIPTION OF THE DRAWINGS

The present invention is illustrated hereinbelow by the description of examples with reference to the accompanying drawings, wherein.

DESCRIPTION OF THE PREFERRED EMBODIMENT

The method of making a line of die sets involves the following operations.

Figure 1:
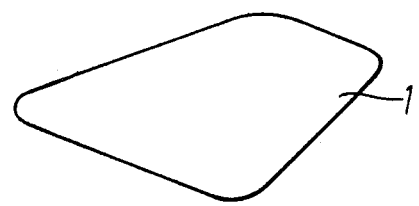
FIG. 1 represents a sheet blank.

A blanking die set is made tentatively according to a theoretical contour of the blank, its components such as male and female dies, a stripper, and a knock-out being made with a working profile allowance of 5 to 10 mm with respect to the theoretical contour of the blank 1 (FIG. 1).

The other die sets in the line, such as drawing, piercing, trimming, and outward flanging die sets, are made to final size.

Figure 2:
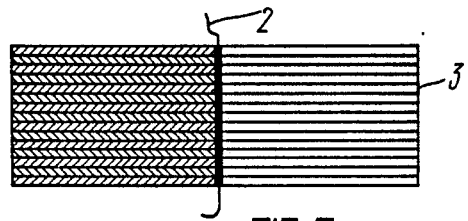
FIG. 2 represents a stack of sheet blanks to be cut in a N/C electrical-discharge machine as per a program made up on the basis of the theoretical contour of the blank.
Figure 5:
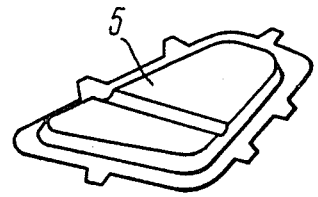
FIG. 5 represents a blank processed with a trimming die set.
Figure 3:
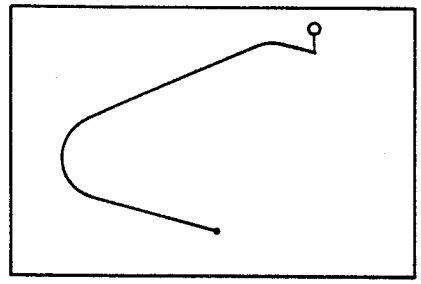
FIG. 3 is a plan view of the same.
Figure 6:
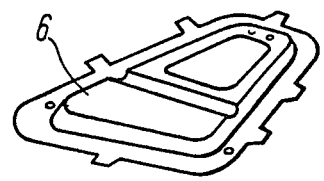
FIG. 6 represents a blank processed with a piercing die set.
Figure 4:
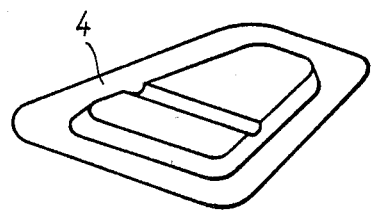
FIG. 4 represents a blank processed with a drawing die set.
Figure 7:
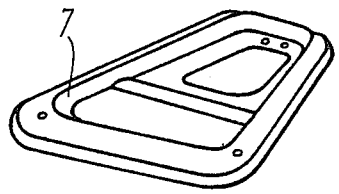
FIG. 7 represents a finished item processed with an outward flanging die set.

Thereafter, as shown in FIGS. 2 and 3, the sheet blank 1 is cut with a wire tool electrode 2 in a N/C electrical-discharge machine according to the theoretical contour of the blank 1, a stack 3 of 10 to 30 pieces (depending upon material thickness) being thus prepared. Subsequently, the sheet blank 1 is stamped in forming die sets, namely a drawing die set for producing a blank 4, a trimming die set for producing a blank 5, a piercing die set for producing a blank 6, and an outward flanging die for producing a finished item 7. The finished item is checked for compliance with the dimensions specified in the drawing. In case there is a surplus or a deficiency of metal, the program of the electrical-discharge machine by which the blank 1 has been made is adjusted and a new stack 3 of blanks 1 are prepared.

The blank 1 is again stamped in forming die sets, the finished item 7 being checked for compliance with the dimensions specified in the drawing. If the item 7 complies with the dimensions specified in the drawing, tool electrodes are cut according to the adjusted program in an electrical-discharge machine. The tool electrodes are used for finishing (burning-through in a piercing electrical-discharge machine) of the male and female dies, the stripper, and the knock-out of the blanking die set, the first die set in the line. The blanking die set being assembled, the line of die sets is ready for service.

Since blanks are made with a wire tool electrode in an electrical-discharge machine rather than being cut in a blanking die set and since the program of the N/C electrical-discharge machine is corrected in accordance with the results of stamping in forming die sets, instead of correcting the individual components of the blanking die set, such as male and female dies, a stripper, and a knock-out, it has become possible to considerably reduce labor consumption, the amount of hand fitting, and the number of operations involved in making a line of die sets.

The present invention may be used in making a line of die sets, primarily in making components of a blanking die set, the first one in the line, which include a male and female dies, a stripper, and a knock-out.

What is claimed is:

1. A method of making a die set line comprising the following steps:

producing a blank by electric discharge machining with a wire tool electrode following a program composed in accordance with the theoretical contour of the blank;

stamping said blank in subsequent die sets;

adjusting the program of electric discharge machining in accordance with the results of stamping said blank in the subsequent die sets; and making tool electrodes in accordance with said adjusted program for electric discharge machining of the working parts of the blanking die set, the first one in the line.

* * * * *